United States Patent [19]
Welker

[11] 4,315,616
[45] Feb. 16, 1982

[54] DUMP VALVE

[76] Inventor: Robert H. Welker, P.O. Box 138, Sugar Land, Tex. 77478

[21] Appl. No.: 117,400

[22] Filed: Feb. 1, 1980

[51] Int. Cl.³ .............................................. F16K 1/38
[52] U.S. Cl. .................................. 251/210; 251/191; 251/332; 251/363
[58] Field of Search ............... 251/210, 332, 363, 190, 251/191

[56] References Cited

U.S. PATENT DOCUMENTS

| | | | |
|---|---|---|---|
| 405,404 | 6/1889 | Forestier | 251/210 X |
| 1,301,278 | 4/1919 | Labus | 251/332 |
| 2,263,750 | 11/1941 | Willke | 251/363 X |
| 2,676,781 | 4/1954 | Hobbs | 251/210 |
| 2,830,784 | 4/1958 | Placette | 251/332 X |
| 2,839,265 | 6/1958 | Hobbs | 251/191 X |
| 2,919,887 | 1/1960 | Patterson et al. | 251/191 X |
| 2,927,767 | 3/1960 | Ray | 251/210 |
| 4,073,308 | 2/1978 | Stith, Jr. | 251/191 X |

FOREIGN PATENT DOCUMENTS 27909 12/1908 United Kingdom ................ 251/210

*Primary Examiner*—Arnold Rosenthal
*Attorney, Agent, or Firm*—Gunn, Lee & Jackson

[57] ABSTRACT

This disclosure is directed to a dump valve. In the preferred and illustrated embodiment, the dump valve incorporates a valve operator and comprises a valve body having a side located port for admission of high pressure fluid and an axial outlet. The valve operator powers an elongate push rod which passes through an axial passage in the body and supports a hard metal valve element at the tip which is profiled to fit against a valve seat, blocking flow in the axially located passage. Additionally, it incorporates a second seat which is formed of a shaped inner valve of resilient material. This comprises a second valve element. The two valve elements collectively seal the passage. This is particularly helpful in that a hard trimmed, primary shutoff mechanism is first provided incorporating the hard trimmed valve element and seat, and a second soft trimmed valve element and seat cooperates with it. The hard trim valve must seat first before the rubber plug is expanded.

10 Claims, 2 Drawing Figures

DUMP VALVE

BACKGROUND OF THE DISCLOSURE

This apparatus is a dump valve. In a pipeline which flows natural gas, it is not uncommon to accumulate condensate on the inner wall of the pipe. Heavier hydrocarbon molecules and water inevitably become entrained in the pipeline flow. Even through an upstream separator removes most of the condensate, some part of it will flow in the stream as entrained droplets. They can, on change of temperature, condense on the wall of the pipe. If the pipeline passes beneath a body of water, the localized cooling of the body of water forms condensate in the pipeline. The condensate collects in low spots in the pipeline and tends to plug the pipeline. If the liquid volume is sufficient, a severe plugging effect can be achieved, and pipeline efficiency is reduced.

The present apparatus is a dump valve adapted to be installed at a selected location in a pipeline incorporating an operator which is connected to the pipeline. More importantly, the dump valve includes two kinds of valve elements arranged on a common stem. The stem or push rod driven by the valve operator is centered in an axial passage through the valve body, and this enables the dump valve to close, perfecting a hard trimmed seal first and a secondary, soft trimmed seal. This closes the valve to continued flow. The apparatus is arranged so that line pressure across the valve seat assists in closure rather than opposing closure. The soft trim valve element comprises an expandable rubber plug which is supported and positioned so that expansion of the plug occurs in a supported fashion.

BRIEF SUMMARY OF THE APPARATUS

This apparatus is a dump valve which has a valve operator operating a valve stem or push rod. The push rod is located in an axial passage through the valve body. There is a central, lateral opening in the valve body into the axial passage which is connected to the high pressure inlet. The valve terminates at an axial outlet, there being a set of inserts installed in the axial passage to function as valve seats. The device utilizes two valve seats. One is a hard trim valve seat cooperative with a hard valve element. The second is an enlarged, tapered insert positioned adjacent to a concentrically located, soft rubber plug which is constrained at opposing end faces. The rubber plug is expandable when axial compressive forces are applied to it. It perfects a secondary seal so that particulate matter in the liquid which is drained through the dump valve does not prevent tight sealing.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE ILLUSTRATED EMBODIMENT

Figure 1:
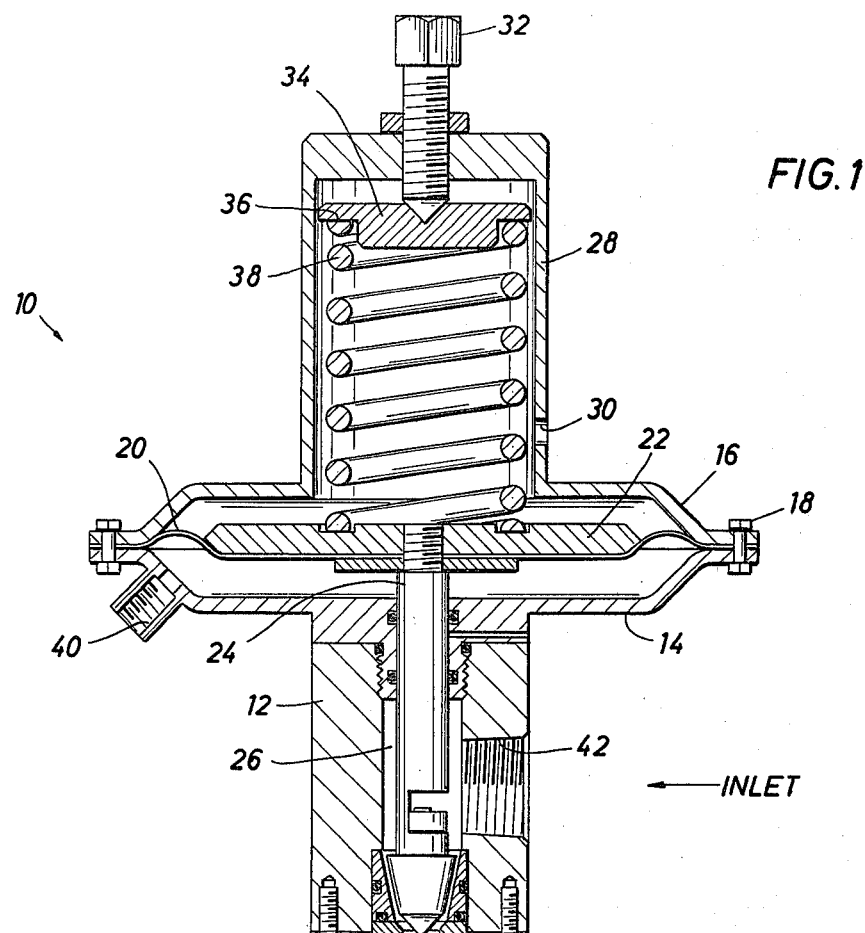
FIG. 1 is a sectional view of the illustrated and preferred embodiment of the dump valve of the present invention.

In FIG. 1 of the drawings, the numeral 10 identifies a dump valve constructed in accordance with the teachings of this disclosure. The dump valve is shown in sectional view. It incorporates a valve body 12 attached by threads to a lower diaphragm housing 14. An upper diaphragm housing 16 cooperates with the lower housing to define a diaphragm receiving chamber. The two diaphragm housings terminate at encircling flanges which are bolted together by bolts 18 which assist in clamping a diaphragm 20 in the diaphragm housing. The diaphragm 20 is formed of relatively thin and flexible material and responds to pressure variations within the housing to flex. The central part of the diaphragm incorporates a stiffening plate 22 which bolts to a push rod 24. The push rod 24 extends through suitable seals to prevent leakage along the push rod. It is received within an axial passage 26 which surrounds the push rod and which is located axially within the housing or body 12.

The upper diaphragm housing 16 includes a cylindrical bonnet 28 which is open to atmosphere through a passage 30. The bonnet 28 supports a bolt 32 which axially threads through the bonnet and presses against a disk 34. The disk 34 incorporates a shoulder 36 serving as a seat for a compression spring 38. The spring 38 applies a downward force to the diaphragm 20. The spring 38 seats in a groove formed in the solid backing plate 22. The backing plate 22 imparts a bias force to the diaphragm dependent on the compression of the coil spring 38. As the spring 38 is compressed, the diaphragm is forced downwardly, and the push rod 24 moves in response to this force. The top side of the diaphragm is exposed to atmosphere through the passage 30. The bottom side of the diaphragm is exposed to a control pressure which is admitted through a fitting 40. The fitting 40 is adapted to receive pressure upstream of the obstruction in the pipeline. If that pressure rises, the rise in pressure is coupled to the diaphragm chamber and moves the push rod 24 upwardly to open the valve. If the pressure drops, the valve moves to a closed position.

The valve body 12 is an elongate, cylindrical body having an axial passage 26 formed in it. A laterally directed, centrally located, high pressure inlet is formed at 42 which is a tapped opening adapted to be connected to a drain line. The drain line extends from the tapped opening 42 to the low spot in the line where condensate collects. The accumulated liquid condensate is drained through the line. While the condensate may well be a liquid which flows readily, it will typically carry scale, rust, particulate debris and other materials. It is anticipated in most service that the condensate carries a large quantity of very hard particles which prevent closure of valves where a hard trim valve element seats against a hard trim valve seat.

Figure 2:
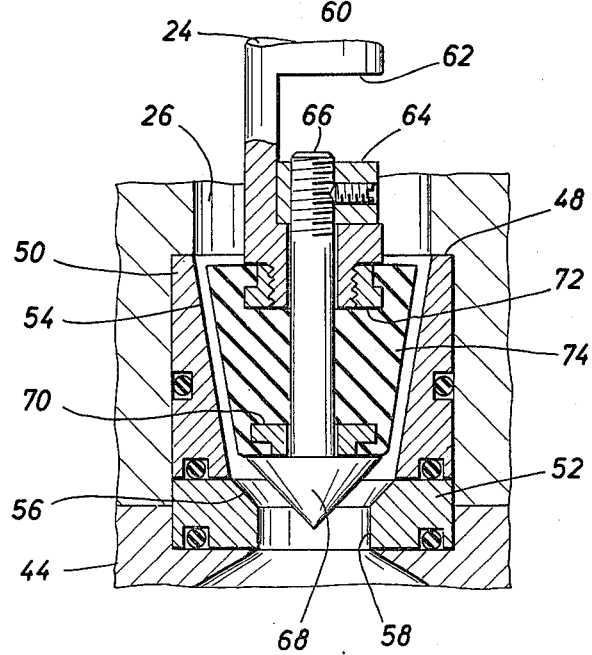
FIG. 2 is an enlarged sectional view of the valve elements shown in FIG. 1.

The tapped opening 42 opens into the axial passage 26 which continues downwardly in the valve body 12 as shown in FIG. 2. The valve body 12 is sealed at the bottom by means of an end plug 44 which terminates at a face or shoulder which abuts the end of the valve body 12. The end plug 44 is held in position by bolts 46. As shown in the enlarged view of FIG. 2, the assembly utilizes a shoulder 48 to clamp a first or upper seat insert 50 in position. The insert 50 is formed of hard material, is sacrifical and is a liner which defines the axial passage and narrows the passage. The upper insert is removable and replaceable. The numeral 52 identifies a second liner which is below the first and similar in construction. Both are locked in position by securing the end plug 44 in place.

The inserts 50 and 52 are stacked on assembly. Furthermore, they are protected against leakage along the exterior by various O-ring seals which are shown in the drawings. The several seals prevent leakage along the exterior and constrain flow through the dump valve to the axial passage.

The insert 50 has a tapered face 54 which serves as a second valve seat. The lower insert 52 supports a face 56 serving as the first valve seat. A constriction 58 located at the bottom of the second insert 52 opens into the tapped outlet 60 shown in FIG. 1.

The push rod 24 is notched at 62. The notch 62 receives a profiled, movable plug 64 which surrounds and threads to a stem 66. The stem 66 is upwardly movable relative to the rod 24. The range of travel is limited by the range of movement for the plug 64. As will be observed, upward movement is permitted, but downward movement from the position of FIG. 2 is prevented by the position of the plug 64 against the shoulder which arrests its movement. The stem 66 is locked in position by a set screw and is integrally constructed with a pointed tip 68 which functions as a valve element which closes against the tapered shoulder 56. Downward movement of the push rod 24 positions the valve element 68 against the shoulder 56. When this occurs, sealing is perfected. This is the first seal in operation of the device. This is the seal which is constructed from hard trim apparatus, namely, metallic components which abut one another at tapered faces. The faces preferably have mating angles. The downward stroke of the rod 24 drives the tapered seal element 68 against the seat and plugs the axial path through the valve against flow.

The seat is contoured to the valve element. Moreover, the metal-to-metal seal perfected by the apparatus precludes flow through the equipment. It will be recalled that the condensate flow likely contains particulate matter flowing with the condensate. To the extent that any particulate matter flows, it is possibly caught and pinched between the seat and valve element, thereby propping the valve open. Miniscule flow may damage the valve seat by eroding the valve seat or element, or both. It is this damaging operating condition which is prevented by the incorporation of the second valve element and the second seat.

The stem 66 is centered within a lower lock ring 70 and a similar and facing upper lock ring 72. The lock rings 70 and 72 are embedded in a resilient plug 74 which functions as a valve element. It will be observed that the plug 74 is bonded to the facing lock rings which are mounted for telescoping movement toward one another. The plug 74 is bullet-shaped when considered in conjunction with the valve element 68. It has a curved outer surface which is subject to expansion and possible distortion on swelling. The plug 74 is slidably carried on the stem 66. As force is applied by the spring 38 downwardly moving the push rod 24, the first valve 68 is closed. The imposition of additional force moves the rod 24 downwardly. The valve element 68 cannot move any further. This forces the stem 66 upwardly in FIG. 2, thereby shortening the rubber plug 74. The plug 74 swells or expands as it is squeezed. As swelling occurs, it expands radially outwardly and comes into contact with the insert 50 at the tapered surface 54. A soft contact is achieved in contrast with the contact of the hard valve element 68.

The second seal perfected by the apparatus utilizing the resilient plug 74 cooperates with the first seal. In the event that a piece of hard material is caught between the valve element 68 and the tapered face 56, continued flow may occur even though the valve is considered fully closed. As additional force is applied, the plug 74 is expanded, thereby expanding into contact. This blocks leakage. As leakage is blocked, no further problem arises in the operation of the valve. It achieves a true shutoff. Full and complete shutoff is ordinarily not accomplished except on relative telescoping movement of the stem 66 and the piston rod 24.

The valve element 68 is formed of heat treated metal or other equally hard and acceptable material. The seat inserts 50 and 52 are preferably formed of very hard metal, typically in the range of 440 C steel or harder. The resilient plug 74 normally has a durometer in the range of 80.0 to 85.0 on the Shore A scale. While other values can be used, it is believed that the representative values of hardness provide a structure which works quite well, even when significantly high pressure differentials are imposed on the dump valve.

It is important to note that the pressure drop which occurs across the dump valve 10 assists in closure. This pressure drop is applied to the top end of the resilient plug 74. The pressure drop of closure assists in closing the valve securely against minute leakage. The term "hard valve" in the claims refers to a metallic or ceramic valve element not capable of ready elastic flow. Typical materials are hardfacing, heat treated metals and include tungsten carbide particle impregnated supportive matrices. The "soft valve" refers to an expandable rubber plug able to expand on applying compressive force thereto. Typical materials include various plastics or rubber compounds.

While the foregoing is directed to the preferred embodiment of the present invention, other and further embodiments of the invention may be devised without departing from the basic concept thereof, and the scope thereof is determined by the claims which follow.

I claim:

1. A dump valve which comprises:
    (a) a valve body having an axial passage therethrough with an inlet and outlet connected to said passage, said inlet delivering dump fluid to said axial passage which flows through said outlet;
    (b) valve operator means incorporating an elongate push rod positioned in said valve body and extending along said axial passage, said push rod movably received therein and supporting a movable stem;
    (c) a first valve seat being removably positioned within said axial passage upstream of said outlet;
    (d) hard valve means supported by said push rod for movement into contact with said valve seat for sealing said axial passage against flow between the inlet and outlet thereof, said movable stem being secured to said hard valve means;
    (e) a second removable valve seat serially arranged with said first valve seat in said axial passage;

(f) soft valve means surrounding said stem and being squeezed between said hard valve means and said push rod, said soft valve means being radially expandable on application of a compressive force thereto, whereby radial expansion of said soft valve means forms sealing contact against said second valve seat;

(g) wherein said first and second valve seats are located serially in said passage to control flow through said outlet; and (h) means retaining said first and second valve seats in fixed and removable assembly within said axial passage.

2. The apparatus of claim 1 wherein said push rod telescopically supports said stem, said stem being mounted for reciprocation, and wherein said stem is positioned axially through a passage in said soft valve means to apply a compressive force thereto by moving a pair of facing, relatively movable, end located disks against said soft valve means.

3. The apparatus of claim 1 wherein:
(a) said soft valve means is telescoped about said stem and comprises an encircling plastic body; and
(b) said stem compresses said soft valve means between a pair of facing disks opposing said plastic body.

4. The apparatus of claim 3 including:
(a) an encircling receptacle for said stem, said receptacle having the form of an end located passage in said push rod; and
(b) a means limiting telescoping movement of said stem in said receptacle.

5. A dump valve which comprises:
(a) a valve body having an axial passage therethrough with an inlet and outlet connected to said passage, said inlet delivering dump fluid to said axial passage which flows through said outlet said valve body including an internal shoulder about said axial passage;
(b) valve operator means incorporating an elongate push rod positioned in said valve body and extending along said axial passage, said push rod movably received therein;
(c) a valve seat in said axial passage;
(d) hard valve means supported by said push rod for movement into contact with said valve seat for sealing said axial passage against flow between the inlet and outlet thereof;
(e) a second valve seat serially arranged in said axial passage;
(f) soft valve means radially expandable into sealing contact with said second valve seat;

(g) wherein said first and second valve seats are defined by removable inserts and are located serially in said passage to control flow through said outlet, said internal shoulder receiving and aligning said first and second valve seats; and (h) means for clamping said inserts in position.

6. The apparatus of claim 5 wherein:
(a) said shoulder defines a concentric, enlarged drilled passage at the end of said axial passage through said valve body; and
(b) wherein said first and second valve seat inserts are positioned in said enlarged passage.

7. The apparatus of claim 6 wherein said soft valve means comprises an axially hollow, solid, resilient body having a generally cylindrical outer surface with first and second end faces and wherein said end faces each receive embedded lock rings joining said soft valve means for expanding loading from movement of said push rod.

8. The apparatus of claim 7 including seals between said valve body and said inserts to prevent leakage away from said axial passage past said inserts.

9. In a dump valve having a body with an axial passage opening to an outlet, the improvement comprising:
(a) a stem in said passage;
(b) first and second separate and removable tapered valve seats serially arranged in said passage upstream of said outlet, said first and second valve seats defining conical sealing surfaces of differing taper;
(c) means clamping said first and second valve seats in fixed assembly with said body.
(d) first and second valve means supported by said stem for closure against said first and second valve seats, said first and second valve means being of at least partially conical configuration and corresponding respectively to the tapered configuration of said first and second valve seats, said first valve means being composed of hard unyieldable material and said second valve means being composed of soft yieldable material; and
(e) means mounting said first and second valve means for contact against said respective first and second seats in ordered sequence such that said first hard valve means sealingly closes against said first seat and said second soft valve means thereafter closes against said second seat.

10. The apparatus of claim 9 wherein said second valve means and said second valve seat both include tapered parallel walls and the smaller extremity of said conical sealing surface of said second valve seat intersects the larger extremity of said conical sealing surface of said first valve seat.

* * * * *